United States Patent [19]

Schmidt, Jr.

[11] 4,021,883
[45] May 10, 1977

[54] METHOD OF AND APPARATUS FOR REMOVING HIDE FROM AN ANIMAL CARCASS

[75] Inventor: Carl Oscar Schmidt, Jr., Cincinnati, Ohio

[73] Assignee: The Cincinnati Butchers' Supply Company, Cincinnati, Ohio

[22] Filed: Dec. 1, 1975

[21] Appl. No.: 636,808

[52] U.S. Cl. .............................................. 17/21
[51] Int. Cl.² ....................................... A22B 5/16
[58] Field of Search ................. 17/21, 45, 50, 62

[56] References Cited

UNITED STATES PATENTS

| | | | |
|---|---|---|---|
| 3,209,395 | 10/1965 | Jones et al. | 17/21 |
| 3,683,455 | 8/1972 | Anderson | 17/50 |
| 3,835,502 | 9/1974 | Thompson et al. | 17/21 |
| 3,895,416 | 7/1975 | Haws | 17/21 |

FOREIGN PATENTS OR APPLICATIONS 822,865   9/1969   Canada .................................. 17/21

*Primary Examiner*—Louis G. Mancene
*Assistant Examiner*—Peter K. Skiff
*Attorney, Agent, or Firm*—J. Warren Kinney, Jr.

[57] ABSTRACT

A hide-puller includes a pair of transversely spaced, endless, flexible members which define a continuous, vertical path having a forward descending reach and a rearward ascending reach. A horizontal reaction member is secured to, carried by and spans the flexible members and is advanced therewith along the continuous path. A carcass to be stripped of hide is suspended, head-end down, from an overhead support forwardly of and adjacent the descending reach and a stationary anchor member is disposed intermediate of the reaches for securing a loosened, tail-end-adjacent flap of the hide, whereby the reaction member engages and imparts a downward, hide-pulling motion to the hide intermediate of the anchor and the carcass as the reaction member advances in the downward reach.

10 Claims, 4 Drawing Figures

METHOD OF AND APPARATUS FOR REMOVING HIDE FROM AN ANIMAL CARCASS

BACKGROUND OF THE INVENTION

1. Field of the Invention

The present invention is directed to a hide-puller having a stationary anchor member for securing a portion of a loosened hide and a movable reaction member which travels in a continuous, endless path, a portion of which is disposed intermediate of the anchor member and a carcass which is to be stripped of hide.

2. Description of the Prior Art

In certain hide-pullers a loosened flap of hide is clamped or otherwise secured directly to a moving member, whereby movement of the member pulls the flap and strips the hide from the carcass. In other hide-pullers the flap of hide is secured to an anchor and a reaction member is advanced relative to the carcass for engaging and imparting a hide-pulling motion of the hide intermediate of the carcass and the anchored hide flap.

The present invention falls into the latter class of hide-pullers and is adapted for stripping the hide from a carcass which is suspended, head-end down, from an overhead support, wherein a tail-end-adjacent hide flap is secured to an anchor, and a reaction member is advanced downwardly relative to the carcass to impart a hide-pulling motion to the hide.

The most pertinent art known to applicant is found in U.S. Pat. Nos. 3,815,177 and 3,895,416, each of which discloses a hide puller of the type in which a reaction member is advanced downwardly along a continuous path to impart a hide pulling motion to the hide intermediate of a carcass which is suspended, head-end down, from an overhead conveyor and a loosened, tail-end-adjacent hide-flap which is manually held on a stationary holder. The device illustrated in each of these patents is specifically directed to a method and apparatus for removing the fragile skins or pelts from animal carcasses such as sheep or lambs, wherein clamping often results in tearing or otherwise damaging the fragile skin. As illustrated in FIG. 1 of these patents, an endless chain 17 defines a continuous path having a pair of laterally spaced, substantially vertical reaches. A plurality of arms 20 are mounted to and project radially outward from the chain, each of said arms supporting a reaction roller 21 which is mounted for free axial rotation. A holder C is disposed rearwardly of the reaches of chain 17 and includes an elongate, horizontal, stationary drum 40. The carcass to be stripped of hide is suspended, head-end-down, from an overhead conveyor. The heel and shank portions of the hide are hand-skinned, bringing the loose skin down below the tail and the buttocks of the carcass. The belly portion of the hide may also be slit down the center to produce a loose end portion of the hide from the hind of the carcass. The suspended, partially peeled carcass is then positioned forwardly of chain 17 and in alignment with drum 40, as shown in FIG. 5. An operator, standing on platform 36, grasps the loosened hide portion, places it over drum 40, and holds it there with his hands. Chain 17, wich is in constant operation, being driven by motor 30, lowers one of arms 20, whereby its roller 21 engages the hide between the carcass and the holder 40. As the roller advances downwardly from position 21a to position 21c (FIG. 5) the hide is stripped from the carcass.

Applicant is also aware of the following U.S. Patents, each of which relates to and discloses a hide puller of the general type in which a carcass is suspended head-end down from an overhead rail during the hide pulling operation:

U.S. Pat. Nos. 3,478,386; 3,541,637; 3,553,767; 3,588,947; 3,683,445; and 3,737,949 disclose hide pullers in which a downwardly applied pulling force is imparted to a tail-end-adjacent hide flap.

U.S. Pat. Nos. 3,129,454; 3,229,328; 3,324,505; 3,346,911; 3,404,431; 3,423,789; 3,461,482; 3,599,277; 3,621,514 and 3,789,458 disclose hide pullers of the general type in which the forelegs, head or other head-adjacent portion of the carcass is suitably anchored against movement incident to the application of an upwardly applied pulling force directed to a head-end adjacent hide flap.

U.S. Pat. Nos. 3,235,905, and 3,370,320 disclose hide pullers in which a guide, shield, backboard or the like limits movement of the suspended carcass toward the pulling apparatus incident to the application of an upwardly applied pulling force directed to a head-end adjacent hide flap.

U.S. Pat. Nos. 2,494,138 and 3,894,311 disclose hide pullers in which a head-end-adjacent hide flap is pulled in one direction while the forelegs of the carcass are pulled in another, substantially opposite direction.

The present invention is clearly distinguishable over the hide-pullers of the prior art.

SUMMARY OF THE INVENTION

The hide puller of the present invention is adapted for removing the hides from swine, beef or the like by advancing a reaction member along a continuous path downwardly intermediate of a carcass suspended, head-end down, from an overhead support and an anchored, tail-end-adjacent hide flap and thence upwardly rearwardly of the carcass and anchor.

The hide-puller includes a stationary, horizontal anchor which is disposed intermediate of the front and rear, vertical reaches of the continuous path of an elongate, horizontal member. A carcass to be stripped of hide is suspended, head-end down, from an overhead support. After the hide is partially peeled from the tail-end adjacent portion of the suspended carcass to provide a loosened hide flap, the carcass is positioned forwardly of the front reach of the continuous path and the hide flap is clamped or otherwise suitably secured to the anchor. As the reaction member advances downwardly along the front reach, it engages and imparts a downward, hide-pulling motion to the hide intermediate of the anchor and the carcass.

DESCRIPTION OF THE PREFERRED EMBODIMENT

Figure 3:
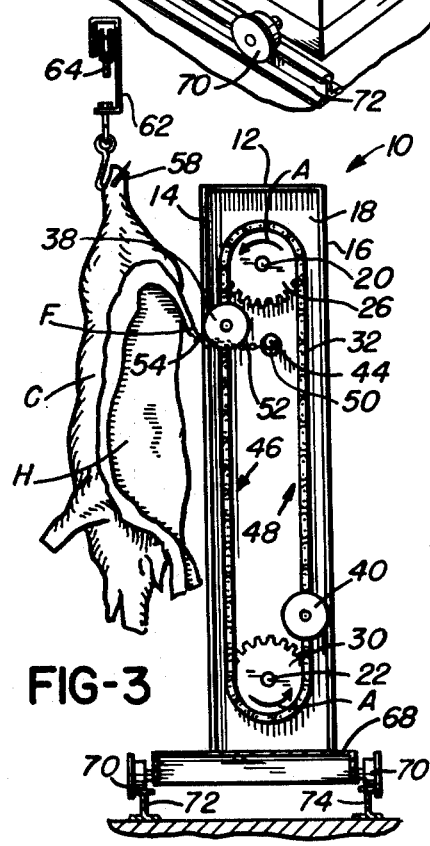
FIG. 3 is a view taken at line 3—3 of FIG. 2.

The hide-puller includes an elongate, upstanding support structure such as, by way of example, housing 10 having top wall 12, front wall 14, rear wall 16 and one side wall 18, with an opposite, open side 19. A pair of elongate, longtiudinally spaced, parallel shafts 20, 22 are mounted for rotational movement in the upper and lower portions of housing 10, respectively, each for supporting a pair of axially spaced sprockets 24–26 and 28–30, respectively. The sprockets 26, 30 are in vertical alignment for supporting and engaging a first endless flexible member such as, by way of example, chain 32. Sprockets 24, 28 are similarly aligned for supporting and engaging a second chain 34. Chains 32, 34 collectively define a continuous path including a first or forwardly disposed, substantially vertical reach 46 and a second or rearwardly disposed reach 48 which is spaced laterally from and is substantially parallel to the first reach. Drive means at 36 are suitably disposed in driving relationship with shaft 22 for advancing chains 32, 34, in synchronous movement, about the endless path in the direction of arrows A (FIG. 3).

One or more reaction members such as, by way of example, the elongate rollers 38, 40 are secured to, carried by and movable with chains 32, 34. Each roller is mounted for free rotational movement on the free outer end of a mounting or support shaft 42 which is fixedly secured to both chains 32 and 34 and projects axially, horizontally therefrom, beyond open side 19 of housing 10 in a direction substantially parallel to shafts 22, 24. In the preferred embodiment, the longitudinal section of each of rollers 38 and 40 defines a symmetrical concave curve which corresponds, generally, to the shape of the back of the carcass. This ensures that the hide is spread substantially across the entire length of the rollers during the hide pulling operation.

An anchor member such as, by way of example, the elongate post 44 is mounted in housing 10 and is disposed intermediate of the laterally spaced reaches 46, 48. The post is in substantial parallelism with mounting shafts 42 and is adapted for receiving the enlarged ring 50 at one end of anchor chain 52.

Both the reaction rollers and the anchor post project horizontally outwardly of the vertical plane defined by the outer side of chain 32 and beyond the open side 19 of housing 10.

Carcass C, which is to be stripped of hide, is suspended, head-end down, from an overhead support. After the carcass has been prepared for hide removal by slitting the belly portion and partially peeling the foreleg and hindleg areas to provide a loosened flap of hide, the suspended carcass is positioned forwardly of front wall 14 and adjacent the forward reach 46 of chains 32, 34. One end of the anchor-chain is suitably secured to the tail-end-adjacent portion of flap F and ring 50 is impaled on anchor post 44. Preferably, the spine of the carcass is in substantial alignment with the center or mid-point of rollers 38, 40. It will be noted that post 44 is of sufficient length to align anchor chain 52 with the center or mid-point of rollers 38, 40 during the hide pulling operation.

As chains 32, 34 are advanced in the direction of arrows A, reaction roller 38 advances downwardly in reach 46 and initially engages chain 52 (FIG. 3) to impart a downward, hide-pulling motion to the hide H. The reaction member continues its downward motion until the hide is completely stripped from the carcass. It will be noted that movement of the carcass toward the housing is limited by contact between the reaction roller and the flesh side of the hide during the hide pulling operation. This minimizes the danger of contaminating the carcass since it precludes contact of the exposed carcass with housing 10.

Figure 4:
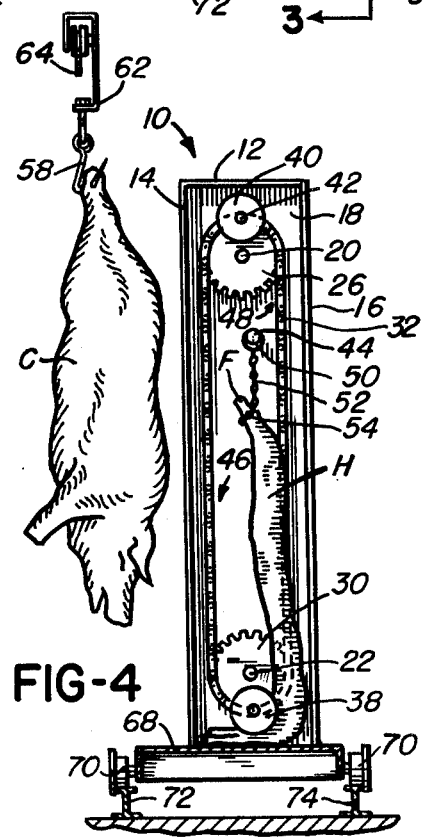
FIG. 4 is a view similar to FIG. 3, and shows the hide-puller after the hide has been completely stripped from the carcass.

When the hide is completely stripped from the carcass and the reaction member 38 has advanced to the lowermost end of reach 46 (FIG. 4), hide H is removed from the hide-pulling apparatus by releasing ring 50 of the anchor chain from anchor post 44. Reaction member 38 is then advanced upwardly in reach 48 and is returned to the uppermost end of reach 46 for subsequent hide-pulling operations.

Where a plurality of reaction members 38 and 40 are utilized, reaction member 40 is at the uppermost end of reach 46 when reaction member 38 is at the lowermost end thereof (see FIG. 4). At this time the stripped carcass C may be removed and a new carcass to be stripped of hide may be suspended adjacent the hide puller, whereby reaction member 40 effects stripping of this carcass while reaction member 38 returns to the uppermost end of reach 46.

Figure 1:
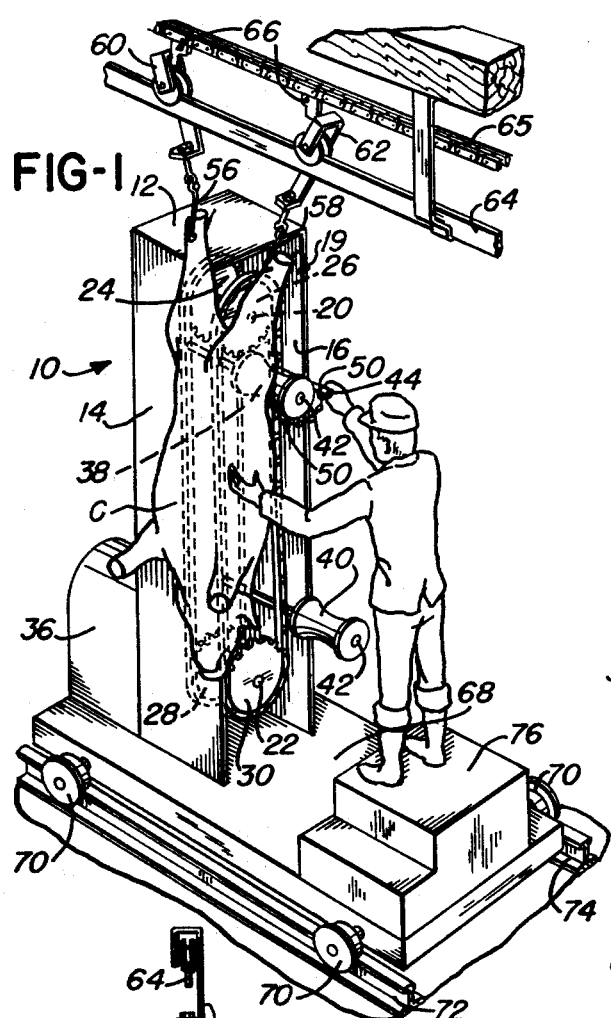
FIG. 1 is a perspective view of a hide-puller which incorporates the teachings of the present invention.
Figure 2:
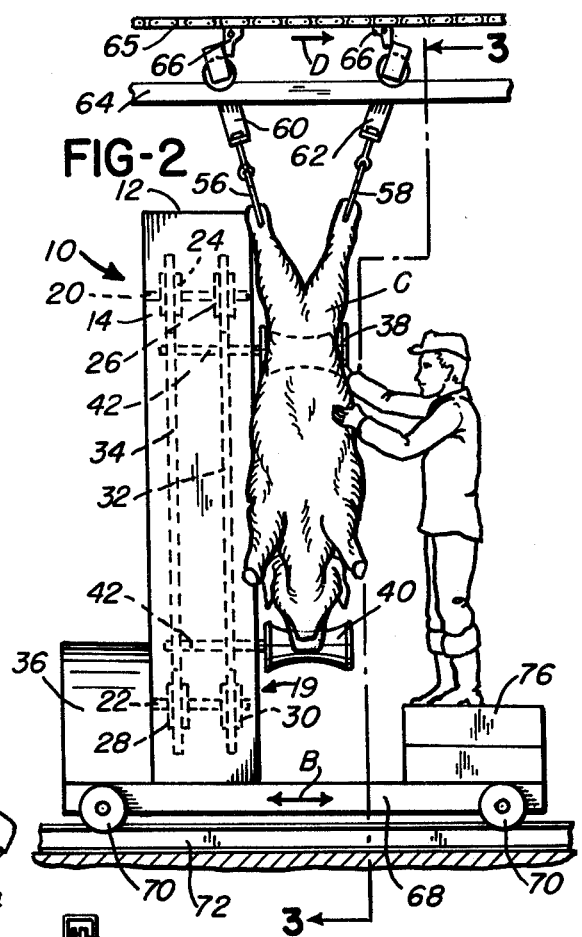
FIG. 2 is an elevation view of the hide-puller of FIG. 1.

In the preferred embodiment, housing 10 and the drive means at 36 are mounted on platform 68 which includes a plurality of wheels 70 adapted for engaging parallel, spaced apart rails 72, 74, whereby the entire hide-pulling apparatus may be moved as indicated by arrow B (FIG. 2). An elevated work station 76 is provided on platform 68, whereby an operator may readily secure ring 50 of the anchor chain to anchor post 44.

Carcass C is suspended, head-end down, from an overhead conveyor rail 64 by a pair of hooks or shackles 56, 58 which are carried by and depend from rail-engaging trolleys 60, 62 respectively. An endless conveyor such as, by way of example, chain 65 includes a plurality of trolley-engaging members 66 for maintaining a predetermined spaced relationship between trolleys 60, 62. Chain 65 is adapted to be advanced in the direction of arrow D (FIG. 2), whereby the carcass C is moved from station to station in a meat processing facility or the like.

Rail 64 is parallel to platform-supporting rails 72, 74, and the hide-puller may be continually advanced with the advancing carcass throughout the hide pulling operation. Once the hide H has been stripped from the carcass, platform 68 and the hide-puller carried thereby are returned to a predetermined starting position for stripping the next advancing carcass, whereas stripped carcass C is further advanced along rail 64 in the direction of arrow D.

It should, of course, be understood that the downward motion of the hide-puller of the present invention minimizes the likelihood of accumulation of dirt, hair, and other particles on the carcass during the hide-pulling operation.

1. A hide puller comprising:
an upstanding support structure;
a pair of laterally spaced, parallel endless flexible members carried by and movable relative to said support structure along upright paths which include a descending reach and an ascending reach, said flexible members having inner sides generally disposed toward each other and outer sides generally disposed away from each other;
power means connected to said flexible members to impart essentially synchronous movement thereto;
a horizontally extending elongate anchoring member located between said flexible member reaches and having one end thereof fixedly mounted on said support structure adjacent one of said flexible members and another end thereof free and located outwardly of and beyond a vertical plane defined by said outer side of the other flexible member so that said anchoring member projects horizontally outwardly of and beyond said other flexible member outer side;

a horizontally extending elongate support member secured to both of said flexible members for movement therewith, said support member having a free end located outwardly of and beyond said vertical plane;

connecting means for releasably connecting a hide to said anchoring member thereby fixing the hide to said support structure; and contacting means on said support member for contacting said connecting means at a location between the hide and said anchoring member so that movement of said flexible members is transmitted to said connecting means via said contacting means for pulling the hide from a carcass suspended adjacent said support structure.

2. A hide puller as called for in claim 1 wherein said contacting means includes a reaction member rotatably secured to and carried by the free end of said support member.

3. A hide puller as called for in claim 2, wherein the reaction member is of symmetrical, concave curvature in longitudinal section.

4. A hide puller as called for in claim 1, wherein the support structure includes elongate side and end walls which define a housing within which the flexible members are located, said housing being open along that side from which the elongate support and anchor member project.

5. A hide puller as called for in claim 5, which includes means mounting the support structure for movement along a track at right angles to the ascending and descending reaches of said flexible members.

6. A hide puller as called for in claim 1, wherein said anchoring member is disposed adjacent the upper end of said ascending and descending reaches.

7. A hide puller as called for in claim 1, including a plurality of support members.

8. A hide puller as called for in claim 1, further including an overhead carcass mounting means for suspending the carcass adjacent said support structure.

9. A hide puller as called for in claim 1, wherein said connecting means includes an anchor chain, a slip loop on one end of said anchor chain and a ring on the other end of said anchor chain for connecting said anchor chain to the free end of said anchoring member.

10. A hide puller as called for in claim 9, wherein said chain is of sufficient length so that said contacting means initially engages said chain near the midpoint thereof.

* * * * *